United States Patent [19]
Rankel

[11] Patent Number: 5,197,751
[45] Date of Patent: Mar. 30, 1993

[54] REAR WHEEL TRACKING DEVICE

[76] Inventor: Richard C. Rankel, 2010 Willow Wisp La., Spring, Tex. 77388

[21] Appl. No.: 729,035

[22] Filed: Jul. 12, 1991

[51] Int. Cl.$^5$ .............................................. B62D 53/06
[52] U.S. Cl. .................................. 280/426; 280/444; 280/97
[58] Field of Search ............... 280/419, 426, 442, 444, 280/97, 100

[56] References Cited

U.S. PATENT DOCUMENTS

| | | | |
|---|---|---|---|
| 1,712,063 | 5/1929 | Agramonte | 280/442 X |
| 2,498,779 | 2/1950 | Winchester | 280/442 X |
| 2,662,782 | 12/1953 | Wilson | 280/426 |
| 3,290,058 | 12/1966 | Ellerd | 280/442 X |
| 3,477,742 | 11/1969 | Barrington | 280/444 |

FOREIGN PATENT DOCUMENTS

| | | | |
|---|---|---|---|
| 924915 | 2/1955 | Fed. Rep. of Germany | 280/442 |
| 631950 | 6/1962 | Italy | 280/442 |
| 1428651 | 10/1988 | U.S.S.R. | 280/442 |

Primary Examiner—Margaret A. Focarino
Assistant Examiner—Kevin Hurley
Attorney, Agent, or Firm—Kenneth A. Roddy

[57] ABSTRACT

A gear mechanism is disclosed which is installed between the bottom of a trailer and the trunion shaft of a rear wheel assembly of the trailer to cause the rear wheel assembly of the trailer to rotate in the opposite direction from the turning direction of the forward end of the trailer. A plurality of pinion gears are rotatably mounted in the space between a hollow inner cylindrical member and a hollow outer cylindrical member. The inner and outer cylindrical members are secured at their bottom ends to a bottom ring gear and their top ends are received on thrust bearings mounted in a top ring gear. The top ring gear is attached to the bottom of the trailer and the bottom ring gear is attached to the trunion shaft of the rear wheel assembly. The toothed surface of the pinion gears are in rolling engagement on the rack gear portions of the top and bottom ring gears. As the trailer turns, the top ring gear rotates in one direction about the vertical axis and will transfer the force through the pinion gears to rotate the lower ring gear which is attached to the trunion shaft of the rear wheel assembly in the opposite direction. The amount of rotation of the rear wheels will determined by the gear ratios used in the device. The gear mechanism will decrease the amount of lane space needed to complete a turn and also provides better control of the total trailer while in operation.

9 Claims, 5 Drawing Sheets

REAR WHEEL TRACKING DEVICE

BACKGROUND OF THE INVENTION

1. Field of the Invention

This invention relates to a gear mechanism which is installed between the bottom of a trailer and the trunion shaft of the rear wheel assembly of the trailer to cause the rear wheel assembly of the trailer to rotate in the opposite direction from the turning direction of the forward end of the trailer.

2. Brief Description of the Prior Art

There are several patents that relate to a rear wheel steering device most of which have a control of some type that is connected to the front steering means of the vehicle.

U.S. Pat. No. 4,313,514 discloses a ratio change mechanism in which a lever is utilized for changing the ratio of the turning angle of the rear wheels to the turning angle of the steering wheel. With this system a pivoted lever is connected to the steering mechanism at one end and the rear wheel turning mechanism at the other end and the ratio is changed by moving the pivotal center of the pivoted lever.

U.S. Pat. No. 4,572,316 uses a pivoted member to change the rear wheel steering ratio. This member is connected to a change ratio device which is activated by a rod connected to the front steering mechanism.

U.S. Pat. No. 4,669,774 which also controls the steering of rear wheels uses a control device. This control device activates the turning of the wheels by computing the speed of the wheels by connecting speed sensors to each wheel. The control device then operates an actuator to turn the rear wheels.

U.S. Pat. No. 4,538,824 uses a system of tie-rods for turning the rear wheels which are connected to the front steering system.

McGregor, U.S. Pat. No. 4,824,135 discloses a self-steering trailer axle which utilizes a ratchet plate and pawl to pivot the spindle on which the hubs of the wheel are mounted relative to the kingpin. The mechanism pivots about the horizontal axis of the axle when the trailer is moved in a forward or reverse direction. The wheel spindles are pivotally mounted upon the steering knuckle plate and may be pivoted in front of or behind the kingpin by means of a ratchet wheel which is engaged or disengaged by changing the direction of the movement of the axle. McGregor also teaches a control linkage assembly which may be connected to the trailer axle and to the trailer hitch or to the towing vehicle steering such that a change in direction of the towing vehicle while operated in a rearward direction is transmitted directly to the control linkage.

Ishizuka, U.S. Pat. No. 3,337,234 discloses a trailer with front and rear wheel assemblies having axles which are pivotally connected to the trailer chassis for rotation about a vertical axis and each is provided with a sprocket. The front and rear sprockets are connected by an endless chain to rotate the front and rear axles in opposite directions. Thus, Ishizuka teaches a direct connection between the front and rear wheel assemblies whereas applicants' do not use any connection between the front and rear wheel assembles and utilize the turning motion of the trailer to rotate the rear wheel assembly in the opposite direction.

The present invention is distinguished over the prior art and these patents in particular by a gear mechanism which is installed between the bottom of a trailer and the trunion shaft of a rear wheel assembly of the trailer to cause the rear wheel assembly of the trailer to rotate in the opposite direction from the turning direction of the forward end of the trailer. A plurality of pinion gears are rotatably mounted in the space between a hollow inner cylindrical member and a hollow outer cylindrical member. The inner and outer cylindrical members are secured at their bottom ends to a bottom ring gear and their top ends are received on thrust bearings mounted in a top ring gear. The top ring gear is attached to the bottom of the trailer and the bottom ring gear is attached to the trunion shaft of the rear wheel assembly. The toothed surface of the pinion gears are in rolling engagement on the rack gear portions of the top and bottom ring gears. As the trailer turns, the top ring gear rotates in one direction about the vertical axis and will transfer the force through the pinion gears to rotate the lower ring gear which is attached to the trunion shaft of the rear wheel assembly in the opposite direction.

SUMMARY OF THE INVENTION

It is therefore an object object of this invention to provide a steering device for the rear wheels of a trailer or vehicle which is mechanically independent from the front steering system of the trailer or vehicle.

It is another object of this invention to provide a gear mechanism which is attached between the bottom of a trailer and the trunion shaft member of the rear wheel assembly of the trailer and causes the rear wheels of the trailer to rotate in the opposite direction from the turning direction of the forward end of the trailer.

Another object of this invention is to provide a gear mechanism which is attached between the bottom of a trailer and the trunion shaft member of the rear wheel assembly of the trailer and causes the rear wheels of the trailer to rotate in the opposite direction from the turning direction of the forward end of the trailer and wherein the amount of rotation of the rear wheels is determined by the gear ratios used in the gear mechanism.

Another object of this invention is to provide a gear mechanism attached between the bottom of the trailer and the rear wheel assembly of the trailer which will decrease the amount of space needed for a trailer to complete a turn.

Another object of this invention is to provide a gear mechanism attached between the bottom of the trailer and the rear wheel assembly of the trailer which will aid in having better control of the trailer while being towed.

A further object of this invention is to provide a gear mechanism attached between the bottom of the trailer and the rear wheel assembly of the trailer which will decrease the allow a towed trailer to change traffic lanes faster and decrease delay time on lane shifting.

A still further object of this invention is to provide a gear mechanism which is easily attached between the bottom of the trailer and the trunion shaft of the rear wheel assembly and which is simple in construction, economical to manufacture, and rugged and reliable in operation.

Other objects of the invention will become apparent from time to time throughout the specification and claims as hereinafter related.

The above noted objects and other objects of the invention are accomplished by a gear mechanism which is installed between the bottom of a trailer and the trunion shaft of a rear wheel assembly of the trailer to cause the rear wheel assembly of the trailer to rotate in the opposite direction from the turning direction of the forward end of the trailer. A plurality of pinion gears are rotatably mounted in the space between a hollow inner cylindrical member and a hollow outer cylindrical member. The inner and outer cylindrical members are secured at their bottom ends to a bottom ring gear and their top ends are received on thrust bearings mounted in a top ring gear. The top ring gear is attached to the bottom of the trailer and the bottom ring gear is attached to the trunion shaft of the rear wheel assembly. The toothed surface of the pinion gears are in rolling engagement on the rack gear portions of the top and bottom ring gears. As the trailer turns, the top ring gear rotates in one direction about the vertical axis and will transfer the force through the pinion gears to rotate the lower ring gear which is attached to the trunion shaft of the rear wheel assembly in the opposite direction.

BRIEF DESCRIPTION OF THE DRAWINGS

FIG. 4A is a top view of the outer cylindrical member of the gear mechanism.

DESCRIPTION OF THE PREFERRED EMBODIMENT

Figures 1A, 1B:
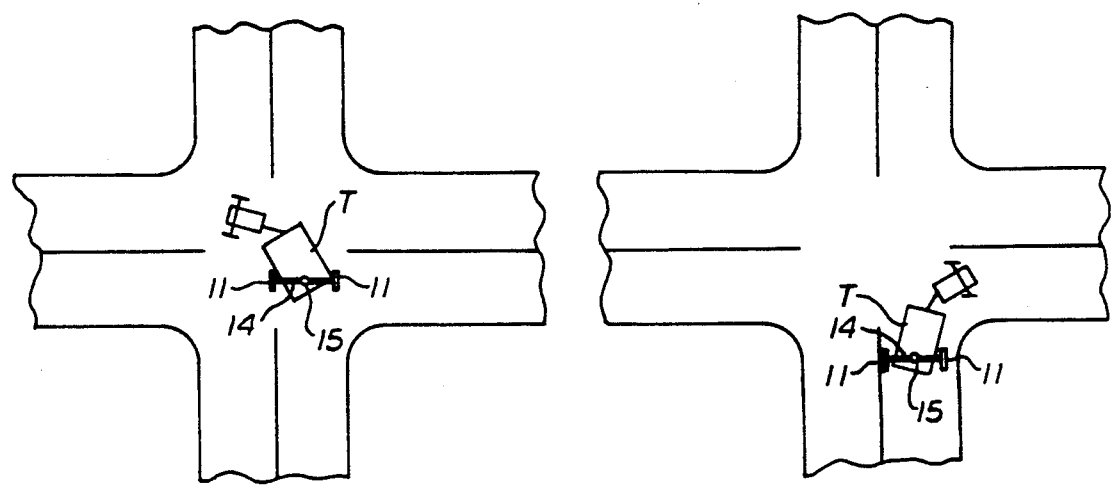
FIGS. 1A and 1B are schematic illustrations of a trailer being pulled, showing the paths that would be taken when equipped with the gear mechanism of the present invention.

Referring to the drawings by numerals of reference, there is shown in FIG. 1A the path a trailer T equipped with the present steering device will take on left turns. The present steering device will aid in keeping the trailer off the center stripe on left turns. FIG. 1B shows the path a trailer so equipped will take on right turns. The steering device according to the present invention will aid in keeping the trailer off curbs and on the pavement on right turns.

Figure 2:
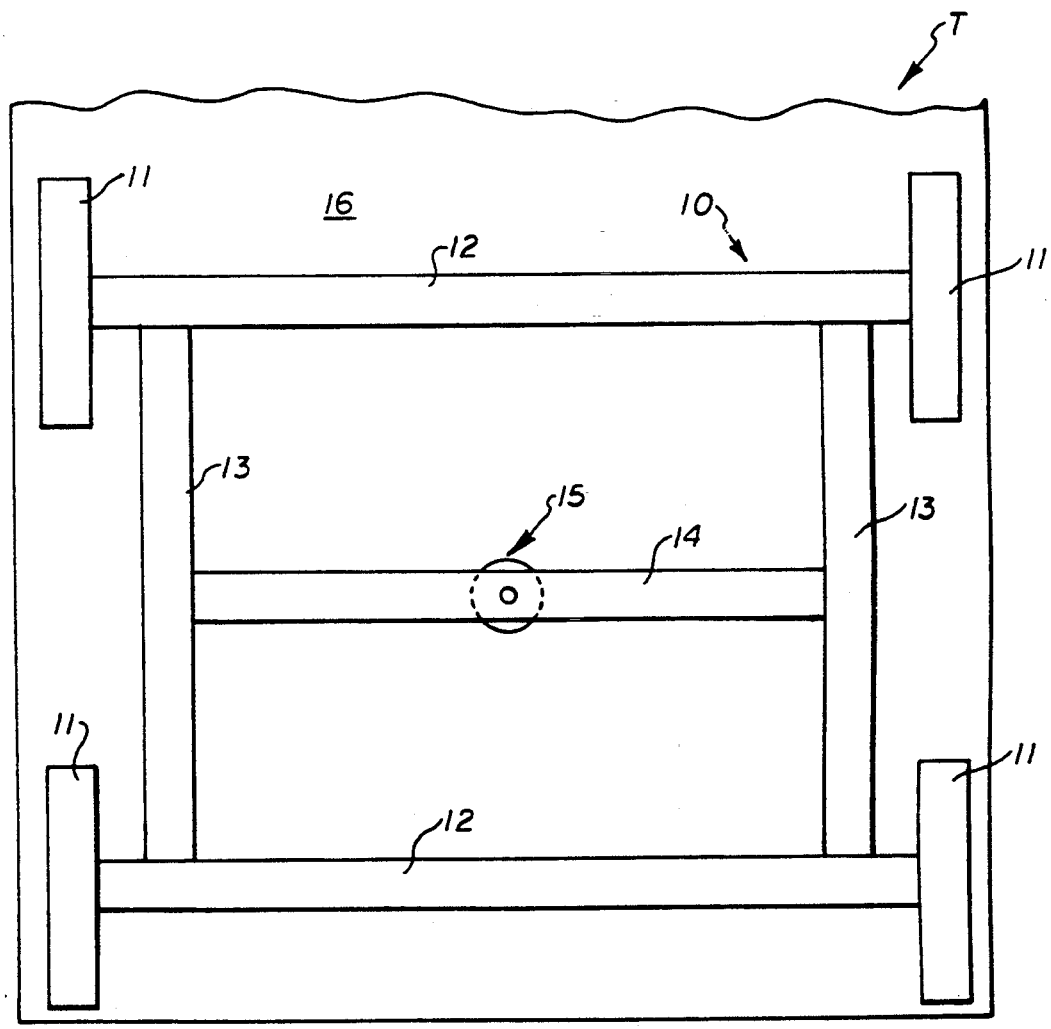
FIG. 2 is a schematic shows schematically where the gear mechanism is to be attached to the trailer.

The basic concept of the present invention will be described with reference to FIG. 2 which shows, somewhat schematically, the rear axle assembly of a trailer. The rear axle assembly 10 has four wheels 11 which are bolted to axles 12. The axles 12 are, in turn, connected by steel beams and springs 13. A steel H-beam called the trunion shaft 14 extends transversely between the two springs 13. The gear device 15 of the present invention, is centered on the trunion shaft 14. The gear mechanism 15 is attached between the bottom of the trailer box 16, and the trunion shaft 14. On a single mounted trailer wheel assembly the gear device 14 would be mounted atop the rear axle.

As the trailer T switches lanes or turns a corner, the forward end of the trailer moves in a right or left direction and the gear mechanism 15 causes the rear wheel assembly 10 to rotate about its vertical axis in the opposite direction from the turning direction of the forward end of the trailer. FIG. 2 shows a preferred way of mounting the mechanism.

Figure 3A:
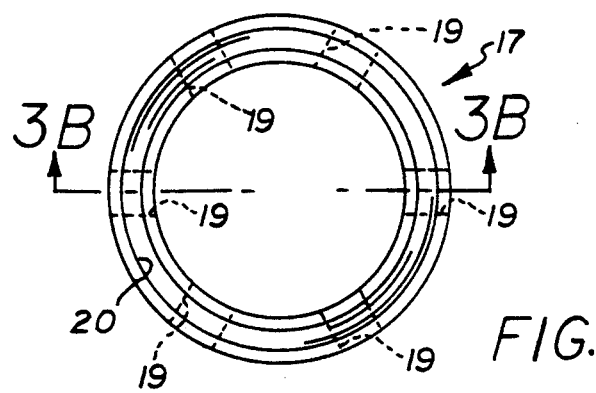
FIG. 3A is a top view of the inner cylindrical member of the gear mechanism.
Figure 3B:
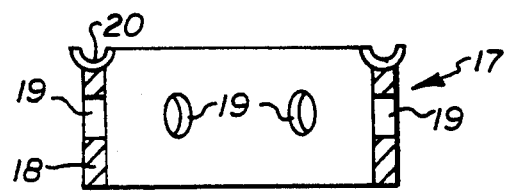
FIG. 3B is a cross section view of the inner cylindrical member of the gear mechanism taken along line 3B—3B of FIG. 3A.

FIGS. 3A and 3B show a hollow inner cylindrical member 17 which is used in the present gear device 15. The inner cylindrical member 17 has a side wall 18 with six holes 19 therethrough spaced 60° apart. One end of the inner cylindrical member 17 has an enlarged semicircular concave groove forming a bearing race 20.

Figure 4B:
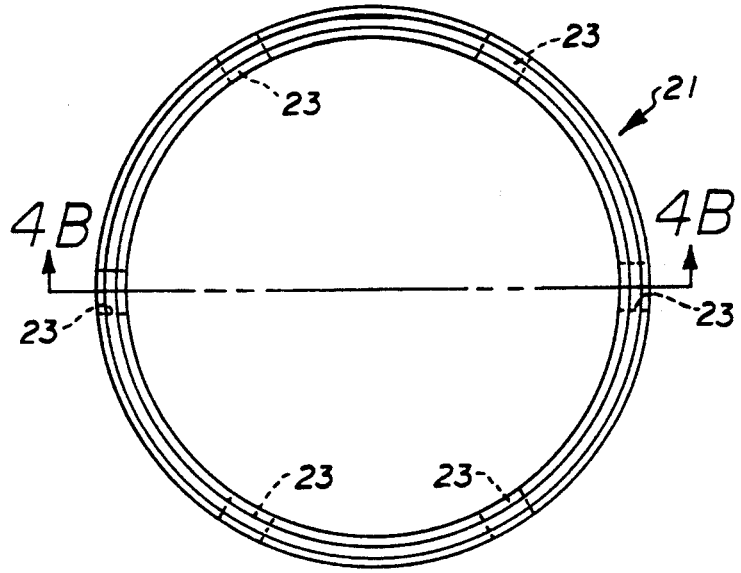
FIG. 4B is a cross section view of the outer cylindrical member of the gear mechanism taken along line 4B—4B of FIG. 4A.
Figure 4B:
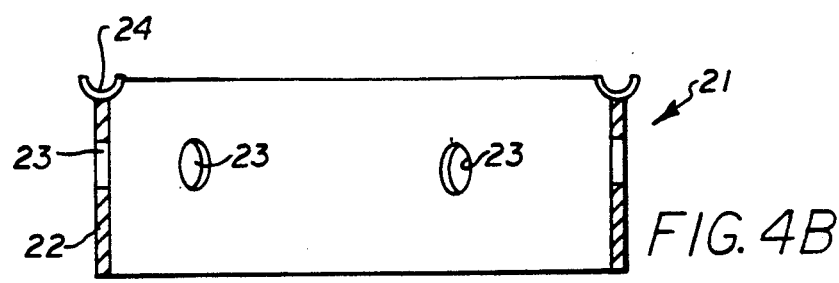
Figure 7:
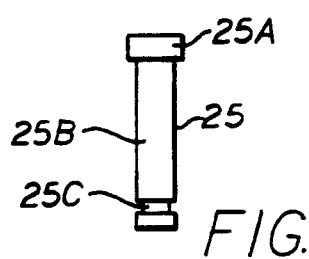
FIG. 7 is an elevation view of a pinion shaft used in the gear mechanism.

FIGS. 4A and 4B show a hollow outer cylindrical member 21 similar to the inner cylindrical described above, but larger in diameter. The outer cylindrical member 21 has a side wall 22 which also has six holes 23 therethrough spaced 60° apart. One end of the outer cylindrical member 21 has an enlarged semicircular concave groove forming a bearing race 24. The holes 19 and 23 of the inner and outer cylindrical members 17 and 21, respectively, are substantially the same diameter, such that when axially aligned will receive a pinion shaft 25, as seen in FIG. 7, and described hereinafter.

Figure 5A:
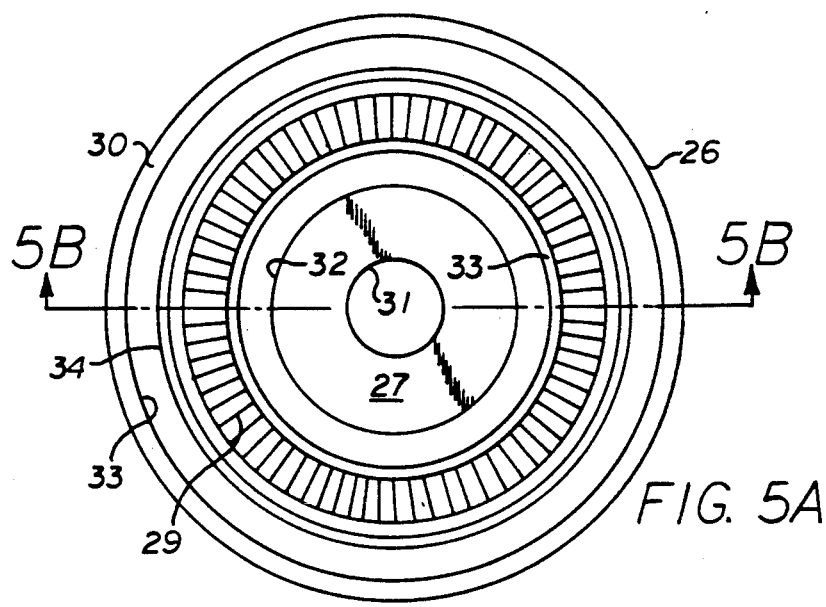
FIG. 5A is a top view of the bottom ring gear of the gear mechanism.
Figure 5B:
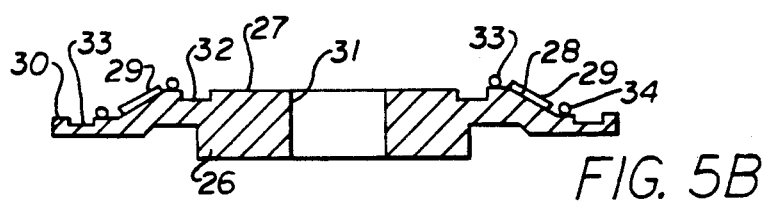
FIG. 5B is a cross section view of the bottom ring gear of the gear mechanism taken along line 5B—5B of FIG. 5A.

FIGS. 5A and 5B show a ring gear 26 which is used for the bottom of the gear device 15. One face of the bottom ring gear 26 has a flat top portion 27, a downwardly and outwardly tapered portion 28 which is provided with rack gear teeth 29 and a lower flat portion 30 surrounding the rack tooth portion 28. A hole 31 extends through the center of the ring gear 26. An inner groove 32 is provided in the flat portion 27 and an outer groove 33 concentric therewith is provided in the lower flat portion 30. A pair of small diameter steel rings 33 and 34 are welded one to the top flat portion 27 and the other to the lower flat portion 30 just inwardly and outwardly, respectively, of the tapered rack portion 28 to assist in retaining the pinion gears (FIGS. 8A and 8B) on the rack portion, as described hereinafter. The non-grooved end of the inner cylindrical member 17 is received in the inner groove 31 and welded to the ring gear 25. The plain end of the outer cylindrical member 20 is received in the outer groove 32 and welded to the ring gear. The holes 18 and 22 in the cylindrical members are axially aligned prior to welding.

Figure 8A:
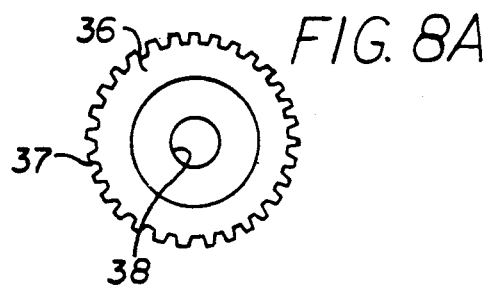
FIG. 8A is a top plan view a pinion gear of the gear mechanism.
Figure 8B:
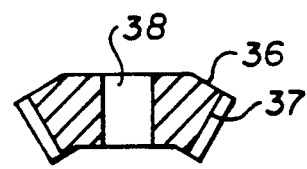
FIG. 8B is a cross section view of the pinion gear taken along line 8B—8B of FIG. 8A.

FIGS. 8A and 8B show one of six pinion gears 36 which are used in the gear device 15. The exterior of each pinion gear 36 is tapered and provided with a toothed surface 37 corresponding to the tapered rack portion 28 of the bottom ring gear 26. A hole 38 extends through the center of each pinion gear 36. The pinion gears 36 are received 60 degrees apart in the space between the inner and outer cylindrical members 17 and 21 with their toothed surface 37 in rolling engagement on the rack tooth portion 28 of the bottom ring gear 26. Six pinion shafts 25 (FIG. 7), are provided and each has a head 25A at one end of a shank portion 25B with a groove 25C near the end of the shank portion. The shank 25B of each pinion shaft 25 is received through the holes 23 in the outer cylindrical member 21, the hole 38 in the pinion gears 36, and the holes 19 in the inner cylindrical member 17. The pinion gears 36 are free to rotate on the pinion shaft 25. The pinion shafts 25 are locked in place by a C-clip 39 installed in the groove 25C. Thus, the pinion gears 36 are secured rotatably between the inner and outer cylindrical members.

Figure 6A:
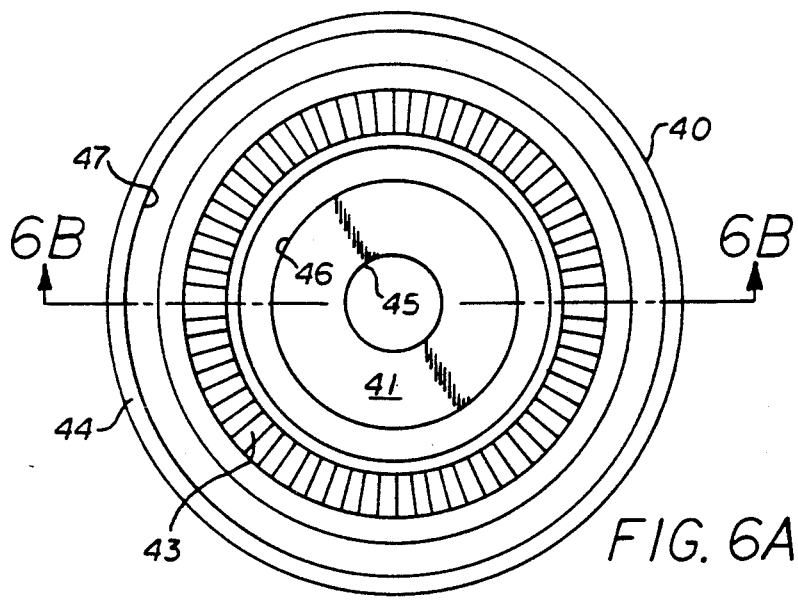
FIG. 6A is a top view of the top ring gear of the gear mechanism.
Figure 6B:
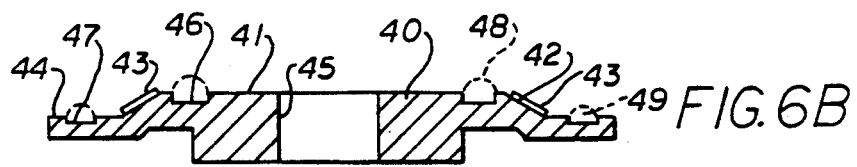
FIG. 6B is a cross section view of the top ring gear of the gear mechanism taken along line 6B—6B of FIG. 6A.

FIGS. 6A and 6B show a ring gear 40 which is used for the top of the gear mechanism 15, and is affixed to the vehicle trailer T. One face of the top ring gear 40 has a flat top portion 41, a downwardly and outward tapered portion 42 which is provided with rack gear teeth 43 and a lower flat portion 44 surrounding the rack tooth portion 42. A hole 45 extends through the center of the top ring gear 40. An inner groove 46 is provided in the flat portion 41 and an outer groove 47 concentric therewith is provided in the lower flat portion 44. A conventional thrust bearing 48 is pressed into the inner groove 46 and another conventional thrust bearing 49 is pressed into the outer groove 47. In the assembled condition, the bearing race 20 of the inner cylindrical member 17 is received on the thrust bearing 48 and the bearing race 24 of the outer cylindrical member 21 is received on the bearing 49 and the toothed surface 37 of each pinion gear 36 is engaged between the opposed top and bottom ring gears on the rack tooth surfaces 28 and 42. Thus, as the top ring gear 40 rotates in one direction about the vertical axis it will transfer the force through the pinion gears 36 to rotate the lower ring gear 26 in the opposite direction.

Figure 10:
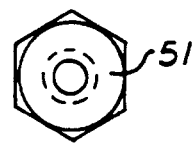
FIG. 10 is a top plan view of a nut that fits the post-bolt of FIG. 9.
Figure 9:
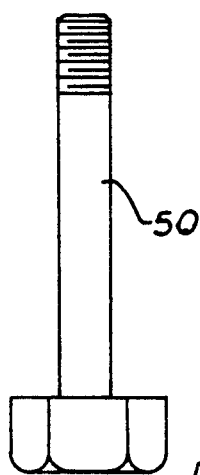
FIG. 9 is an elevation view of a post-bolt used in the gear mechanism

FIG. 9 shows a post-bolt 50 which is inserted through the trunion shaft 14, the assembled gear mechanism 15, and the trailer bottom to secure the gear assembly in place. FIG. 10 shows a nut 51 which screws onto the post-bolt 50.

Figure 11:
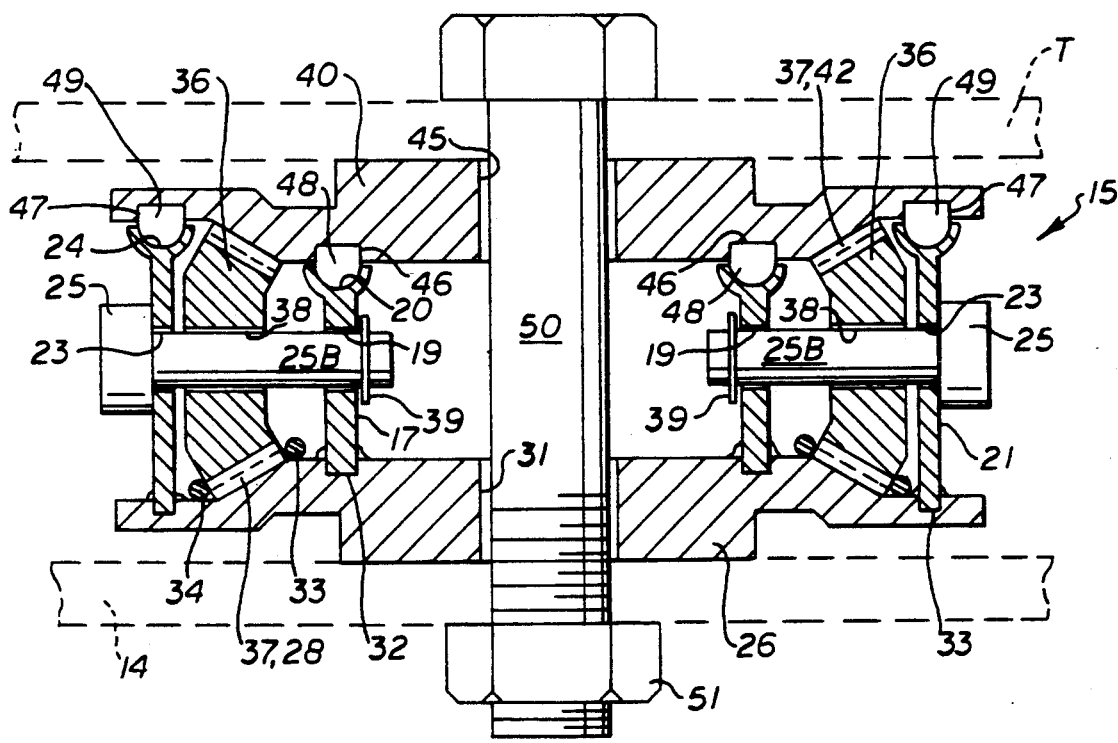
FIG. 11 is a cross section through the present gear mechanism assembly.

FIG. 11 is an assembly drawing of the gear device 15. The inner cylindrical member 17 and the outer cylindrical member 21 are welded in place on the bottom ring gear 26. The non-grooved end of the inner cylindrical member 17 is received in the inner groove 46 and welded to the bottom ring gear 26. The plain end of the outer cylindrical member 21 is received in the outer groove 33 and welded to the bottom ring gear 26. The holes 19 and 23 in the cylindrical members are axially aligned prior to welding. The six pinion gears 36 are positioned 60° apart between the inner and outer cylindrical members 17 and 21 with their toothed surface 37 in rolling engagement on the rack tooth portion 28 of the bottom ring gear 26. The pinion gears 36 are secured rotatably in place by pinion shafts 25 whose shanks 25B are slidably received through the holes 38 in the pinion gears. The pinion shafts 25 are locked in place by a C-clip 39 installed in the groove 25C.

The top ring gear 40 having conventional thrust bearings 48 and 49 pressed into grooves 46 and 47 is positioned on top of the inner and outer cylindrical members 17 and 21. The thrust bearing 48 is received in the bearing race 20 of the inner cylindrical member 17 and the thrust bearing 49 is received in the bearing race 24 of the outer cylindrical member 21 and the toothed surface 37 of each pinion gear 36 is engaged between the opposed top and bottom ring gears on the rack tooth surfaces 28 and 42. The assembled components are held together by the post-bolt 50 which is inserted through the trunion shaft 14, the assembled gear mechanism 15, and the trailer bottom and secured by nut 51 to maintain the gear assembly rotatably in place.

Thus, when the rear wheels of the trailer are turning about their axles and as the front end of the trailer pivots in one direction about the center vertical axis of the trunion shaft 14, the top ring gear 40 affixed to the bottom surface of the trailer T will rotate about its vertical axis in the direction of the turning trailer and its rotary motion will be transmitted through the rotatably engaged pinion gears 36 to rotate the bottom ring gear 26 and the horizontal trunion shaft 14 to which it is affixed in the opposite direction causing the rear wheel assembly to turn in the opposite direction from the turning direction of the front end of the trailer.

The amount of rotation of the rear wheels will be determined by the gear ratios used in the device. Preferably, the gear ratio of the top ring gear to the bottom ring gear is less than 1:1 or such that the maximum rotation of the rear wheel assembly about the vertical axis is between 15° and 30° to prevent the wheel assembly from being perpendicular to the longitudinal axis of the trailer during a 90° turn. For example, if the ratio of the top ring gear 40 to the bottom ring gear 26 is 2:1, the trailer could turn a full 90° about the vertical axis of the ring gear (rear wheel assembly) while the rear wheel assembly would rotate only 45° about the vertical axis.

The present invention will decrease the amount of space needed to complete a turn (FIGS. 1A and 1B). It will also aid in having better control of the trailer while being towed. The rear portion of the trailer will move into other lanes of traffic faster, thus decreasing delay time on lane shifting.

While this invention has been described fully and completely with special emphasis upon a preferred embodiment, it should be understood that within the scope of the appended claims the invention may be practiced otherwise than as specifically described herein.

I claim:

1. A method of rotating the rear wheel assembly of a trailer of the type having a bottom surface and a rear wheel assembly including a horizontal trunion shaft beneath the bottom surface about the vertical axis of the trunion shaft in the opposite direction from the turning direction of the front end of the trailer as it turns a corner comprising the steps of:

affixing a top ring gear on the bottom surface of the trailer above the center of the trunion shaft, said top ring gear having a central vertical axis and a downwardly facing toothed surface encircling its vertical axis, affixing a bottom ring gear on the top surface of the horizontal trunion shaft member of the rear wheel assembly of the trailer at its center, said bottom ring gear having a central vertical axis and an upwardly facing toothed surface encircling its vertical axis in vertically opposed relation to said top ring gear, securing a hollow inner cylindrical member vertically between said top and bottom ring gear, securing a hollow outer cylindrical member vertically between said top and bottom ring gears concentric with said inner cylindrical member to form an annulus therebetween, and a plurality of pinion gears interposed and rotatably secured in the annulus between said inner and outer cylindrical members in circumferentially spaced relation with their toothed surfaces rotatably engaged between the opposed toothed surfaces of said top and bottom ring gear with their axis of rotation extending radially from the vertical axis of said inner cylindrical member and having a predetermined gear ratio such that said top and bottom ring gears will rotate relative to one another in opposite directions about their vertical axis, whereby interposing a plurality of pinion gears between the opposed circular toothed surfaces of said top and bottom ring gears in the annulus between said inner and outer cylindrical members in circumferentially spaced relation with their toothed surfaces in rotary engagement with said top and bottom ring gear toothed surfaces, said pinion gears and said top and bottom ring gears being rotatably engaged and having a predetermined gear ratio, such that when the rear wheels of the trailer are turning about their axles and as the front end of the trailer pivots in one direction about the center vertical axis of the trunnion shaft said top ring gear affixed to the bottom surface of the trailer will rotate about its vertical axis in the direction of the turning trailer and its rotary motion will be transmitted through said rotatably engaged pinion gears to rotate said bottom ring gear and the horizontal trunnion shaft to which it is affixed in the opposite direction causing the rear wheel assembly to turn in the opposite direction from the turning direction of the front end of the trailer.

2. A steering gear mechanism for installation on trailers of the type having a bottom surface and a rear wheel assembly including a horizontal trunnion shaft beneath the bottom surface to be installed between the bottom surface of the trailer and the trunnion shaft of the rear wheel assembly to cause rotation of the rear wheel assembly about the vertical axis of the trunnion shaft in the opposite direction from the turning direction of the front end of the trailer as the trailer turns a center, the mechanism comprising;

a top ring gear adapted to be affixed to the bottom of the trailer above the center of the trunnion shafts, said top ring gear having a central vertical axis and a downwardly facing toothed surface encircling its vertical axis, a bottom ring gear adapted to be affixed to the top surface of the horizontal trunnion shaft member of the rear wheel assembly of the trailer at its center, said bottom ring gear having a central vertical axis and an upwardly facing toothed surface encircling its vertical axis in vertically opposed relation to said top ring gear, a hollow inner cylindrical member extending vertically between said top and bottom ring gear and having a vertical axis, a hollow outer cylindrical member extending vertically between said top and bottom ring gears concentric with said inner cylindrical member to form an annulus therebetween, and a plurality of pinion gears interposed and rotatably secured in the annulus between said inner and outer cylindrical members in circumferentially spaced relation with their toothed surfaces rotatably engaged between the opposed toothed surfaces of said top and bottom ring gear with their axis of rotation extending radially from the vertical axis of said inner cylindrical member and having a predetermined gear ratio such that said top and bottom ring gears will rotate relative to one another in opposite directions about their vertical axis, whereby when the rear wheels of the trailer are turning about their axles and as the front end of the trailer pivots in one direction about the center vertical axis of the trunnion shaft said top ring gear affixed to the bottom surface of the trailer will rotate about its vertical axis in the direction of the turning trailer and its rotary motion will be transmitted through said rotatably engaged pinion gears to rotate said bottom ring gear and the horizontal trunnion shaft to which it is affixed in the opposite direction causing the rear wheel assembly to turn in the opposite direction from the turning direction of the front end of the trailer.

3. A steering gear mechanism according to claim 2 in which;

the gear ratio of said top ring gear to said bottom ring gear is less than 1:1 to prevent said rear wheel assembly from being positioned perpendicular to the longitudinal axis of said trailer during a 90° turn.

4. A steering gear mechanism according to claim 2 in which said top and bottom ring gears are each provided with a hole through their center in axial alignment, and said gear mechanism is secured between the bottom surface of the trailer and the horizontal trunnion shaft of the rear wheel assembly of the trailer by an elongate bolt extending through said holes.

5. A steering gear mechanism according to claim 2 in which said inner and outer cylindrical members each have one end secured to one of said ring gears to rotate therewith and are rotatably journalled on the other one of said ring gears to rotate relative thereto whereby rotary motion of one said ring gearing one direction will be transmitted through said pinion gears to drive the other said ring gear in an opposite direction.

6. A steering gear mechanism according to claim 5 in which a pair of circular thrust bearings are secured concentrically on the inwardly facing surface of said top ring gear, said inner and outer cylindrical members are secured at their bottom ends to the inwardly facing surface of said bottom ring gear and their top ends are rotatably slidably received on said thrust bearings.

7. A steering gear mechanism according to claim 5 in which said inner and outer cylindrical members are each provided with a plurality of circumferentially spaced holes through their side wall and are secured to one of said ring gears with said holes in axial alignment, and said pinion gears are rotatably mounted on a shaft extending through said axially aligned holes.

8. A steering gear mechanism according to claim 5 in which said bottom ring gear has a flat top portion, a downwardly and outwardly tapered portion provided with rack gear teeth, and a second flat portion surrounding the rack tooth portion, and said top ring gear has a flat bottom portion, an upwardly and outwardly tapered portion provided with rack gear teeth and a second flat portion surrounding the rack tooth portion.

9. A steering gear mechanism according to claim 8 including a pair of small diameter circular rings secured concentrically to the inwardly facing surface of said bottom ring member radially inwardly and outwardly adjacent said tapered portion to reduce lateral movement of said pinion gears on said rack teeth while allowing rolling engagement on said rack teeth.

* * * * *